US008112771B2

(12) United States Patent
Bernabeu-Auban et al.

(10) Patent No.: US 8,112,771 B2
(45) Date of Patent: Feb. 7, 2012

(54) MANAGING COMPONENT PROGRAMS WITHIN A SERVICE APPLICATION

(75) Inventors: Jose Bernabeu-Auban, Sammamish, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 12/022,756

(22) Filed: Jan. 30, 2008

(65) Prior Publication Data

US 2009/0193439 A1 Jul. 30, 2009

(51) Int. Cl.
*G06F 13/00* (2006.01)
*G06F 9/44* (2006.01)
*G06F 9/46* (2006.01)
*G06F 15/173* (2006.01)
*G06F 17/30* (2006.01)

(52) U.S. Cl. ........ 719/328; 717/174; 717/175; 717/176; 717/177; 717/178; 718/105; 709/226; 707/705

(58) Field of Classification Search .......... None
See application file for complete search history.

(56) References Cited

U.S. PATENT DOCUMENTS

| 7,216,343 | B2 | 5/2007 | Das et al. | |
|---|---|---|---|---|
| 7,246,350 | B2 | 7/2007 | Vu | |
| 7,519,711 | B2 * | 4/2009 | Mohindra et al. | 709/226 |
| 2003/0084155 | A1 * | 5/2003 | Graupner et al. | 709/226 |
| 2005/0251786 | A1 | 11/2005 | Citron et al. | |
| 2007/0294364 | A1 * | 12/2007 | Mohindra et al. | 709/217 |
| 2008/0098457 | A1 * | 4/2008 | Carter | 726/2 |
| 2008/0256531 | A1 * | 10/2008 | Gao et al. | 717/177 |
| 2009/0132856 | A1 * | 5/2009 | Gorman et al. | 714/27 |

FOREIGN PATENT DOCUMENTS

JP 2006119848 A 5/2006

OTHER PUBLICATIONS

International Searching Authority; International Application No. PCT/US2009/030283; Patent Cooperation Treaty; Jul. 31, 2009; 11 pages.

* cited by examiner

*Primary Examiner* — S Sough
*Assistant Examiner* — Phuong Hoang
(74) *Attorney, Agent, or Firm* — Shook Hardy & Bacon L.L.P.

(57) ABSTRACT

Methods, systems, and computer-storage media having computer-executable instructions embodied thereon that, when executed, perform methods in accordance with embodiments hereof, for managing component programs within a service application according to a service model. Initially, configuration settings, which can be administered to the component programs, are extracted from the service model. An instantiation process is initiated to manage the service application in accordance with the changes to a level of load on the service application and/or to specifications within the service model. The instantiation process includes deploying, or identifying as available, the component programs within the data center, and automatically propagating formalized values derived from the configuration settings throughout the deployed component programs. These derived formalized values are installed into the component programs, thereby providing for functionality of the service application consistent with the service model.

17 Claims, 5 Drawing Sheets

MANAGING COMPONENT PROGRAMS WITHIN A SERVICE APPLICATION

BACKGROUND

Typically, software applications are written to allow for many degrees of freedom in their configuration. When leveraging this characteristic, various users are able to set up a particular software application to perform in a manner that is specific to each of the users. Thus, these freedoms incorporated in a single software application enable the software application to produce disparate results.

This type of software application is utilized by application-service providers (ASPs) that allow users to remotely manipulate the application via the Internet. Because the software application includes degrees of freedom, the user may provide performance requirements to the ASPs to manually program into the application. Further, most software applications include separate underlying elements that must be individually identified and manually programmed so that the software application may express the performance requirements. The process of manually programming the underlying elements according to received performance requirements is labor-intensive and error-prone. Accordingly, this ad hoc method for customizing a software application introduces brittleness into the provision of the software application from the ASPs. These shortcomings of manual programming are exaggerated when a multitude of users are continually offering, and changing, their respective performance requirements.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide a service-modeling approach that reduce the shortcomings of manual programming by providing a structure (e.g., instantiation scheme) for automatically managing component programs within a service application according to a service model. Initially, a trigger to instantiate the component programs within the service application is detected. In embodiments, the trigger is based on an indication of a change to a level of load on the service application (e.g., by monitoring traffic at a website hosting the service application), or an indication of a change to the specifications within a service model (e.g., by amending the a service-description contract established between an application-service provider and a client).

Incident to detecting the trigger, configuration settings are extracted from the specifications of the service model, where the configuration settings (e.g., addresses of component programs, algorithm identifiers, service locations, memory-resource addresses, and the like) are utilized to configure parameters within the component programs. In one instance, the component programs are deployed at various computing devices within a data center that executes the service application. In another instance, previously established component programs residing on various computing devices are identified as being available for instantiation. These deployed and/or identified component programs are configured according to an instantiation process that includes the following logical steps: accessing maps (e.g., transformation map, structure map), deriving formalized values from the configuration settings according to the transformation map, automatically propagating formalized values throughout the component programs, locating parameters corresponding to the formalized values according to the structure map, and installing the formalized values at the appropriate parameters. This robust instantiation process configures the component programs automatically, thus, substantially reducing the shortcomings (discussed above) inherent in manual programming.

BRIEF DESCRIPTION OF THE DRAWINGS

Embodiments of the present invention are described in detail below with reference to the attached drawing figures, wherein.

DETAILED DESCRIPTION

Figure 1:
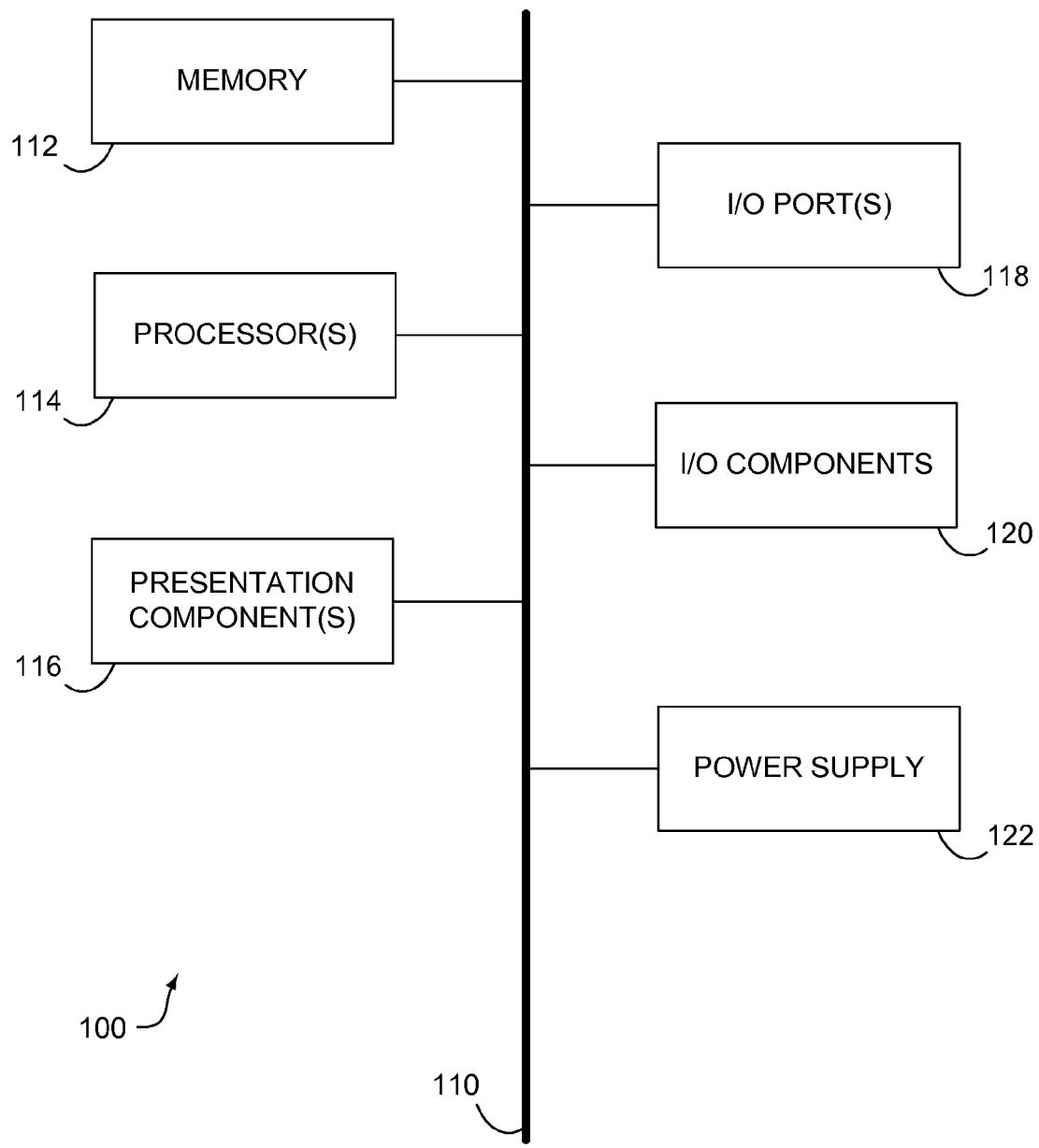
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer storage media having computer-executable instructions embodied thereon that, when executed, perform methods in accordance with embodiments hereof, for automatically managing component programs within a service application according to a service model. Initially, a trigger to instantiate the component programs within the service application is detected. In embodiments, the trigger is based on an indication of a change to a level of load on the service application (e.g., by monitoring traffic at a website hosting the service application), or an indication of a change to the specifications within a service model (e.g., by amending the service-description contract established between an application-service provider and a client).

Incident to detecting the trigger, configuration settings are extracted from the specifications of the service model, where the configuration settings (e.g., addresses of component programs, algorithm identifiers, service locations, memory-resource addresses, and the like) are utilized to configure parameters within the component programs. In one instance, the component programs are deployed at various computing devices within a data center that executes the service application. In another instance, previously established component programs residing on various computing devices are identified as being available for instantiation. These deployed and/or identified component programs are configured according to an instantiation process that includes the following logical steps: accessing maps (e.g., transformation map, structure map), deriving formalized values from the configuration settings according to the transformation map, automatically propagating formalized values throughout the component programs, locating parameters corresponding to the formalized values according to the structure map, and installing the formalized values at the appropriate parameters.

Accordingly, in one aspect, embodiments of the present invention relate to one or more computer storage-media having computer-executable instructions embodied thereon that, when executed, perform a method for managing one or more component programs within a service application according to a service model. The method includes determining a level of load on the service application, where the service application includes the component programs that are executable on separate computing devices within a data center, extracting from the service model configuration settings that can be administered to the component programs, and initiating an instantiation process for managing the service application in accordance with the level of the load. The instantiation process includes deploying the component programs within the data center, automatically propagating formalized values derived from the configuration settings throughout the deployed component programs, and at least temporarily installing the formalized values into the component programs, thereby providing for functionality of the service application consistent with the service model. In embodiments, the method additionally includes executing the service application according to the installed formalized values.

In another aspect, embodiments of the present invention relate to a computer system embodied on one or more computer storage media having computer-executable instructions embodied thereon for performing a method for instantiating a service application by propagating configuration settings to component programs, thereby promoting functionality of the service application. The computer system includes a first computing device and a second computing device. The first computing device executes the component programs that support the operation of the service application. The second computing device initiates an instantiation process for implementing the service application according to a service model. The instantiation process includes extracting configuration settings from specifications within the service model, identifying the component programs residing on the first computing device as being available for instantiation, interrogating parameters within the component programs to establish whether some of the component programs are compatible with the configuration settings, automatically propagating formalized values derived from the configuration settings throughout the compatible component programs, and configuring the parameters of the compatible component programs according to the formalized values.

In yet another aspect, embodiments of the present invention relate to a computerized method for configuring component programs of a service application, operating in a data center, according to an instantiation scheme. The computerized method includes, at least, the following steps: determining configuration settings by interrogating a service model; accessing the instantiation scheme, where the instantiation scheme indicates which component programs to deploy in order to satisfy the service model, and where the instantiation scheme provides a transformation map; deploying the indicated component programs on a plurality of computing devices within the data center; converting the configuration settings to formalized values based, in part, on the transformation map; automatically distributing the formalized values to the deployed component programs; and at least temporarily storing the distributed formalized values in association with the deployed component programs.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including hand held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
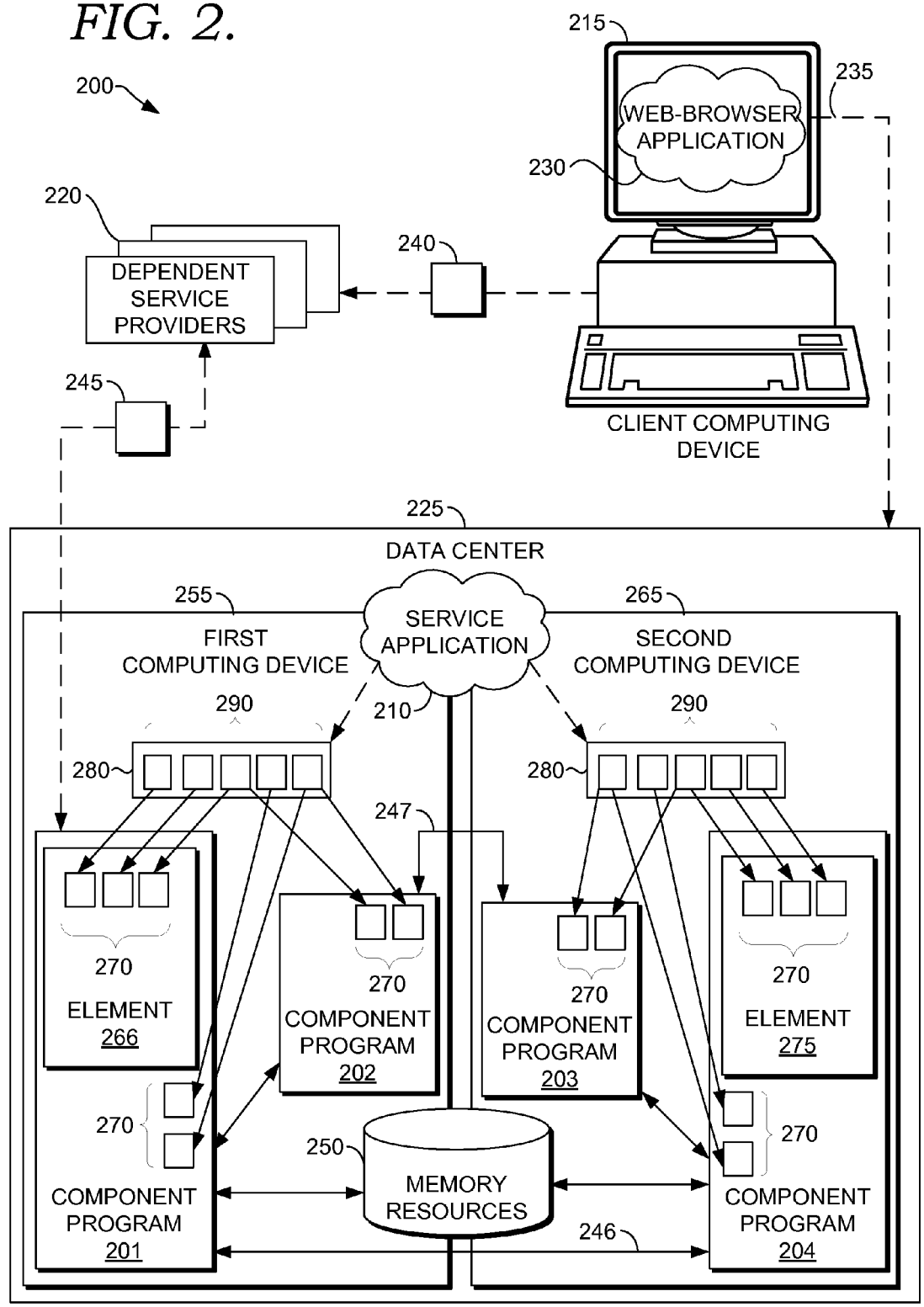
FIG. 2 is a block diagram of an exemplary computing system suitable for use in implementing embodiments of the present invention.

Turning now to FIG. 2, a block diagram is illustrated, in accordance with an embodiment of the present invention, showing a computing system 200 configured to manage component programs 201, 202, 203, and 204 within a service application 210 according to a service model. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy.

The computing system 200 includes a client computing device 215, dependent service providers 220, and a data center 225, all in communication with one another via a network (not shown). The network may include, without limitation, one or more local area networks (LANs) and/or wide area networks (WANs). Such networking environments are commonplace in offices, enterprise-wide computer networks, intranets, and the Internet. Accordingly, the network is not further described herein.

Each of client computing device 215, dependent service providers 220, and data center 225, shown in FIG. 2, can be any type of computing device, such as, for example, computing device 100 described above with reference to FIG. 1. By way of example only, and not limitation, each of client computing device 215, and dependent service providers 220 can be a personal computer, a desktop computer, a laptop computer, a handheld device, a mobile handset, consumer electronic device, and the like. In embodiments, data center 225 can be a server, a collection of computing devices, or other machines capable of executing the service application 210. Additionally, client computing device 215 can further include a web-browser application 230 residing thereon to access service application 210 via wired or wireless network paths to data center 225. It should be noted, however, that embodiments of the present invention are not limited to implementation on such computing devices, but may be implemented on any of a variety of different types of computing devices within the scope of embodiments hereof.

As shown in FIG. 2, client computing device 215 is configured to execute web-browser application 230 to access the service application 210. Service application 210 can be accessed in a generally direct manner, via communication path 235, or by way of dependent service providers 220. In embodiments, access through dependent service providers 220 includes conveying user-provided credentials 240 thereto. Typically, user-provided credentials 240 are login data, passwords, or any other information provided by a client to satisfy security protocol implemented at dependent service providers 220. In turn, dependent service providers 220 exchange credentials 240, within messages 245, with one or more of components 201, 202, 203, and 204.

In embodiments, dependent service providers 220 are located external to data center 225 and managed by an entity separate from an application-service provider that maintains service application 210. However, dependent service providers 220 are able to coordinate activities with the component programs 201, 202, 203, and 204 by exchanging messages 245 therebetween. Coordinating activities between dependent service providers 220 and component programs 201, 202, 203, and 204 is facilitated by resource locations that target dependent service providers 220. These resource locations are typically established according to specifications within a service model.

Generally, the service model is an interface blueprint that provides instructions for managing component programs 201, 202, 203, and 204 of service application 210. Accordingly, the service model includes specifications that identify such aspects of managing as which maps to employ during instantiation; which computing devices to utilize during propagation of component programs 201, 202, 203, and 204; where the communication paths 246 and 247 between component programs 201, 202, 203, and 204 are located; and any other information that describes the particular way service application 210 will be executed by data center 225. In one instance, the service model is generated, in part, according to a service-description contract established between a client and an application-service provider. As a result of the service-description contract, the client is provided with access to the service application 210, and other software, maintained by the application-service provider.

Further, the service model provides hooks within the specifications that allow implicit and explicit configuration settings to be extracted therefrom. In embodiments, implicit configuration settings provide structural information (e.g., component addresses, resource locations, and memory-resource addresses) to facilitate interaction between each of component programs 201, 202, 203, and 204 and/or other components (e.g., dependent services providers 220, memory resources 250). Additionally, the implicit configuration settings provide application programming interfaces (APIs) for consuming and translating messages between the above components, thereby allow the components to communicate harmoniously. In embodiments, explicit configuration settings provide instructions (e.g., algorithm identifiers and other configuration values) to parameters within component programs 201, 202, 203, and 204 that influence the functionality thereof. By way of example only, specified credentials for logging a client into service application 210 are memorialized in the service model. Hooks in the service model provide these credentials to the explicit configuration settings, which distribute the credentials to component 201 as expected values. These expected values are compared against user-provided credentials 240 that are conveyed from dependent service providers 220 in message 245. Upon receipt of message 245, component 201 compares user-provided credentials 240 against the expected values. If the comparison results in a match, the client is provided access to service application 210.

Data center 225 is provided for executing service application 210, among other things. Service application 210 includes a set of component programs 201, 202, 203, and 204 that can be scaled to usage (e.g., number of client hits per hour) or by amendments to the service model. Typically, service application 210 is characterized by being composed of many different components (e.g., component programs 201, 202, 203, and 204), which are similar to traditional applications. In an exemplary embodiment, service application 210 manages the different components such that these components function together as a combined Internet service. By way of example, service application 210 is a blog service that allows a variety of clients to post comments at a particular website. Because there could be potentially thousands of clients all accessing the blog service, multiple components are deployed to which by the blog service to support its continued operation. These components coordinate actions with each other to function as a single application, thus, the deployment and dismissal of components is transparent to the clients.

Although one instance of the service application 210 has been shown and described, it should be understood and appreciated by those of ordinary skill in the art that multiple service applications may be executed within the data center 225, and that embodiments of the present invention are not limited to those the service application 210 shown and described. In the embodiments, having more than one service application, the service application 210 and other service applications (not shown) may operate independently and/or in cooperation with each other. In one instance, service applications running concurrently on the data center 225 share the set of component programs 201, 202, 203, and 204. By way of example only, the set of component programs 201, 202, 203, and 204 can be consumed by a new service application (e.g., reprovisioned according to usage requirements), or shared between service applications (e.g., a plurality of service applications accessing a program component). Thus, the resources on the data center 225, in embodiments, provide for the interoperability of many interdependent, or independent, service applications.

In embodiments, data center 225 includes various machines, such as first computing device 255 and second computing device 265, and memory resources 250. Computing devices 255 and 265 may be any type of computing device, such as, for example, computing device 100 (see FIG. 1), a personal computer, server, a collection of computing devices, or other machines capable of executing service application 210. Additionally, computing devices 255 and 265 are capable of storing and executing component programs 201, 202, 203, and 204. Component programs 201, 202, 203, and 204 embody several components of an array of component programs that are managed by service application 210. In embodiments, component programs 201, 202, 203, and 204 are developed, or written, according to specifications within the service model. In one instance, one or more of component programs 201, 202, 203, and 204 are developed according to a set of rules within the service model that permits parameters 270 to reconfigure automatically upon determining that an update to the configuration settings has occurred. Although four component programs are depicted in FIG. 2 and described herein, embodiments of the present invention contemplate utilizing any number of component programs to support operation of service application 210. In an exemplary embodiment, the number of component programs relates to a level of client load on service application 210, where the higher the level of the load climbs, the more component programs that are deployed.

Parameters 270 typically reside on component programs 201, 202, 203, and 204, or on elements 266 and 275 residing on components 201 and 204, respectively. Generally, parameters fine tune the decisions that each of the components make internally, thereby refining coordinated performance of the components. Parameters 270 are exemplary in number and in nature. That is, although certain parameters are shown on specific component programs or elements, embodiments of the present invention contemplate zero to many parameters residing on any of the component programs or elements.

Memory resources 250 typically reside on data center 225 and are configured to store data. In embodiments, memory resources 250 is searchable for one or more of the items stored in association therewith. It will be understood and appreciated by those of ordinary skill in the art that the data stored in the data store 250 may be configurable and may include any information relevant to execution of service application 210. The content and volume of such information are not intended to limit the scope of embodiments of the present invention in any way. Further, though illustrated as a single, independent component, memory resources 250 may, in fact, be a plurality of data stores, for instance, a database cluster. In addition, the data stored at memory resources 250 is accessible by component programs 201, 202, 203, and 204. In one embodiment, the configuration settings are provided with memory-resource addresses that permit one or more of component programs 201, 202, 203, and 204 to locate memory resources 250, or another appropriate memory allocation, in order to access data therefrom.

In operation, service application 210 is configured to manage component programs 201, 202, 203, and 204. One aspect of managing involves establishing and configuring component programs 201, 202, 203, and 204 upon detecting a trigger event. The trigger event alerts service application 210 to instantiate component programs 201, 202, 203, and 204 within service application 210 upon detecting the trigger event. In embodiments, the trigger is based on an indication of a change to a level of load on service application 210 (e.g., by monitoring traffic from one or more client computing device 215), or an indication of a change to the specifications within a service model (e.g., by amending the service-description contract established between an application-service provider and a client), as more fully discussed below with reference to FIG. 6.

Incident to detecting the trigger, configuration settings 280 are extracted from the specifications and or hooks of the service model. Generally, configuration settings 280 facilitate properly managing service application 210. In embodiments, configuration settings 280 can be implicit or explicit configuration settings, as more fully discussed above. In particular instances, configuration settings 280 include addresses of component programs, algorithm identifiers, service locations, memory-resource addresses, or any other data-string utilized to configure parameters within the component programs.

Incident to, or concurrently with, extracting configuration settings 280, component programs 201, 202, 203, and 204 are established to meet the load, satisfy the updated service model, or for any other reason that pertains to operation of service application 210. In one instance, establishing component programs 201, 202, 203, and 204 includes deploying component programs 201, 202, 203, and 204 at various computing devices 255 and 265 within data center 225. In another instance, establishing component programs 201, 202, 203, and 204 includes identifying as being available for instantiation previously-established component programs residing on various computing devices 255 and 256 and are identified.

Although two different ways of establishing component programs 201, 202, 203, and 204 have been shown, it should be understood and appreciated by those of ordinary skill in the art that other methods for establishing component programs 201, 202, 203, and 204 can be utilized, and that embodiments of the present invention are not limited to those ways shown and described herein.

These deployed and/or identified component programs 201, 202, 203, and 204 are configured according to an instantiation process that includes the following logical steps: accessing maps (e.g., transformation map, structure map), deriving formalized values 290 from configuration settings 280 according to the transformation map, automatically propagating formalized values 290 throughout component programs 201, 202, 203, and 204, locating parameters 270 corresponding to formalized values 290 according to the structure map, and installing formalized values 290 at the appropriate parameters 270. In an exemplary embodiment, parameters 270 are interrogated by service application 210 to determine whether each of components 201, 202, 203, and 204 are compatible with configuration settings 280 prior to installing formalized values 290.

Figure 3:
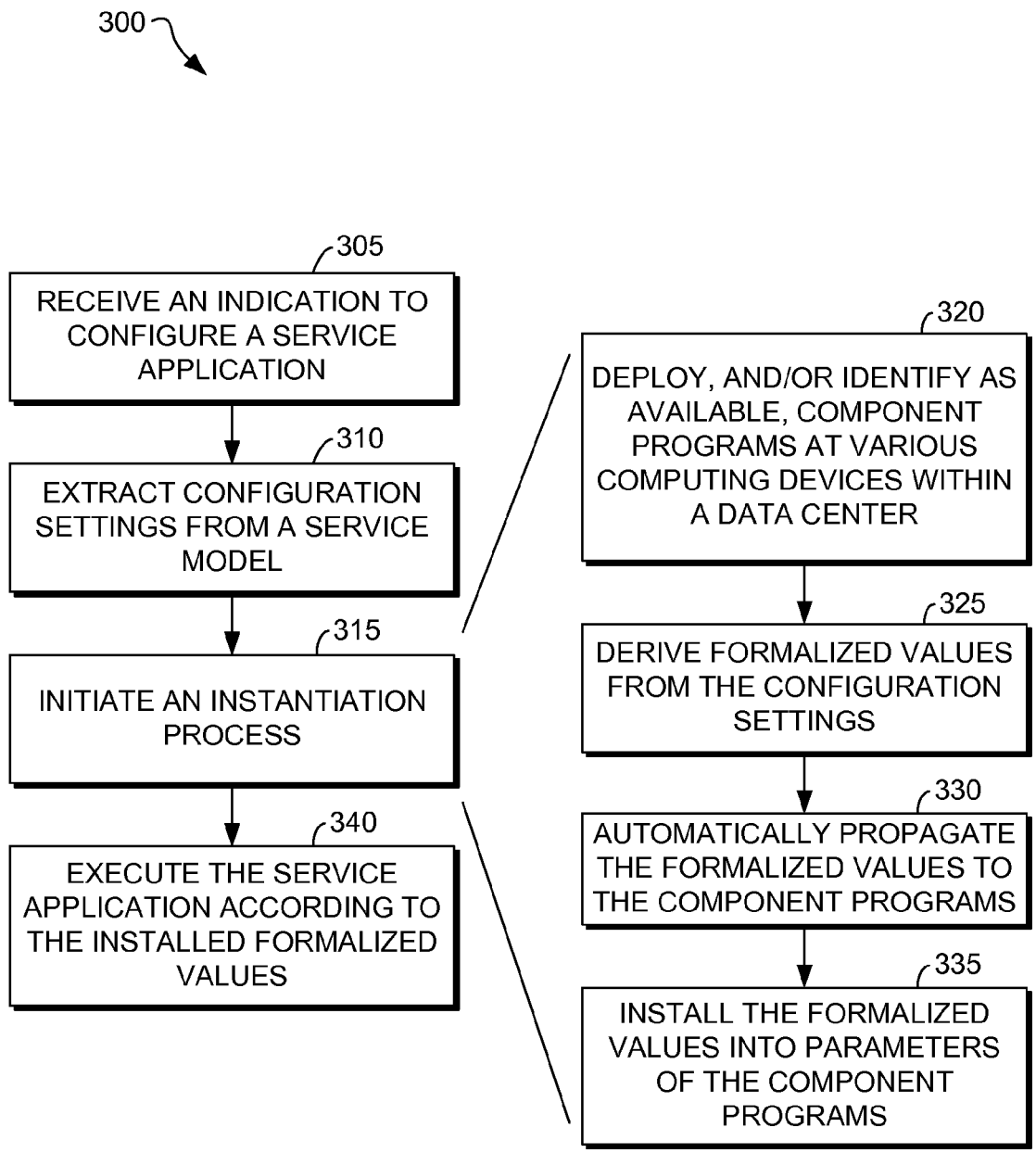
FIG. 3 is a flow diagram showing a method for managing components within a service application according to a service model, in accordance with an embodiment of the present invention.

Turning now to FIG. 3, a flow diagram is illustrated that shows an overall method 300 for managing components within a service application according to a service model, in accordance with an embodiment of the present invention. Initially, as indicated at block 305, an indication (e.g., trigger event) is received at a service application. Trigger events are discussed more fully with reference to FIG. 6. Typically the indication alerts the service application that more or fewer component programs should be established to maintain uniform operation of the service application. In an exemplary embodiment, the addition and subtraction of component programs is transparent to a client who is presently accessing the service application. As indicted at block 310, configuration settings are extracted from hooks upon interrogating specifications within a service model. As more fully discussed above, various types of configuration settings can be extracted, such as implicit and explicit configuration settings.

As indicated at block 315, an instantiation process for managing the service application, in accordance with the trigger events, is initiated. In embodiments, the instantiation process includes, at least, the following logical steps: establishing component programs; deriving formalized values; automatically propagating the formalized values; and installing the formalized values. In particular, as indicated at block 320, the component programs are established by deploying (e.g., generating new component programs), or identifying as available, existing component programs on machines within the data center. In an exemplary embodiment of identifying available existing component programs, parameters within the existing component programs are interrogated to determine whether they are compatible with the configuration settings. Accordingly, these "compatible" component programs receive formalized values during propagation.

In embodiments, these component programs are located at one or various computing devices within a data center. This style of remote deployment is enabled by instructions (e.g., component addresses) provided to the component devices by the configuration settings. In addition, the configuration settings include instructions for configuring an API at some of the component programs thereby allowing each component program to coordinate with other types and instances of component programs, memory resources, and remote dependent service providers (e.g., service maintained by communication partners).

As indicated at block 325, formalized values are derived from the configuration settings. In embodiments, the formalized values are derived according to a transformation map, a determined state of each of the component programs, or a combination thereof. These formalized values are automatically propagated to the deployed component programs, the compatible component programs, or a combination thereof, as indicated at block 330. These steps (e.g., blocks 320, 325, and 330) may be taken in any order or concomitantly. As indicated at block 335, the formalized values are installed at the parameters of the component programs. In other embodiments, the formalized values are temporarily stored in association with a corresponding parameter. Incident to installing the parameters, the service application is executed according to the formalized values, as indicated at block 340.

Figure 4:
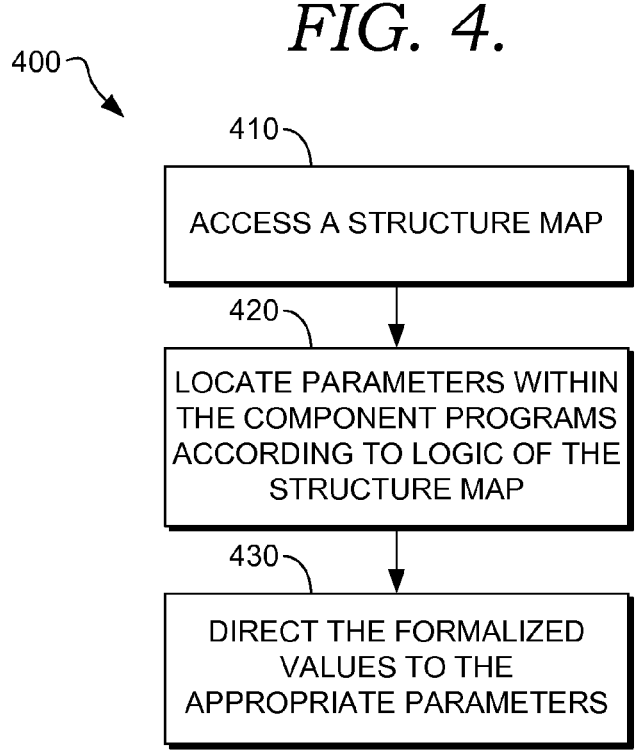
FIGS. 4 and 5 are flow diagrams showing methods for installing the formalized values into appropriate parameters of the component programs.
Figure 5:
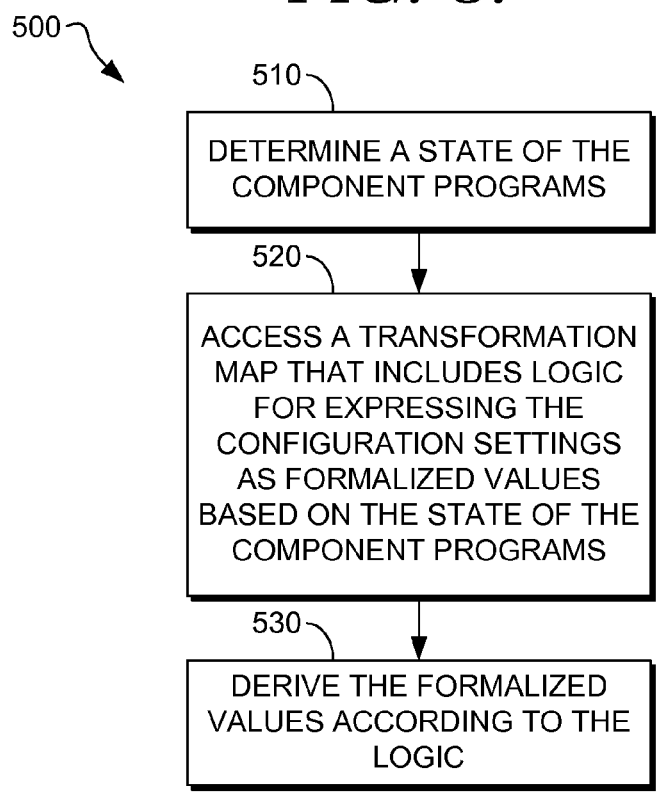

Turning now to FIGS. 4 and 5, flow diagrams are illustrated showing methods 400 and 500 for installing the formalized values into appropriate parameters of the component programs, in accordance with an embodiment of the present invention. With respect to FIG. 4, initially, a map structure is accessed by the service application, as indicated at block 410. In other embodiments, the structure map is accessed by the configuration settings or stored therein. As indicated at block 420, the parameters within the component programs are located according to logic within the structure map. Accordingly, the logic of the structure map assists in directing the formalized values to the appropriate parameters, thereby promoting a proper installation of the formalized values, as indicated at block 430.

With reference to FIG. 5, a state of each of the established component programs is established, as indicated at block 510. In embodiments, the state generally relates to an instance or type of component program, or the existing configuration of the component program. As indicated at block 520, a transformation map is accessed. In an exemplary embodiment, the transformation map includes logic that provides for expressing the configuration settings as formalized values upon entering the determined state of each of the component programs. Based on the logic, formalized values are derived that correspond to each instance of a component program.

Figure 6:
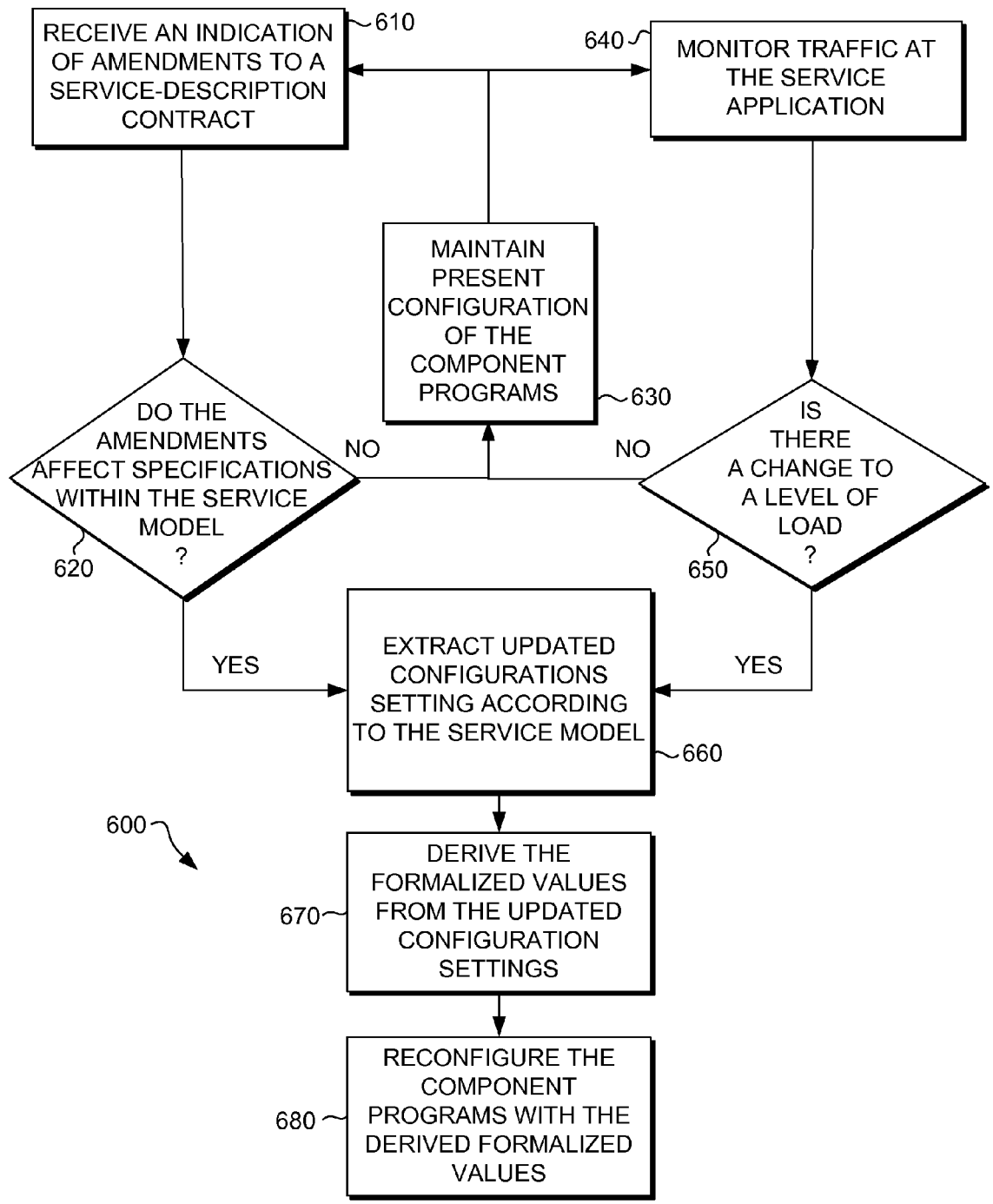
FIG. 6 is a flow diagram a method for responding to a trigger event, in accordance with an embodiment of the present invention.

FIG. 6 is a flow diagram showing a method 600 for responding to a trigger event, in accordance with an embodiment of the present invention. As indicated at block 610, an indication of amendments to a service-description contract are received. As indicated at block 620, a determination of whether the amendments affect specifications within the service model is made. If the determination indicates that no substantial affect is generated, the present configuration of the component programs is maintained, as indicated at block 630. As indicated at block 640, traffic at the service application is monitored. As indicated at block 650, a determination of whether there is a change to a level of a load is made. If the determination indicates that no change, or substantial adjustment, to the level of the load is indicated, the present configuration of the component programs is maintained, as indicated at block 630.

However, if the determinations of blocks 620 and 650 indicate that a trigger event has occurred, (e.g., a substantial change to the level of the load occurred, or an amendment to the specification has driven a substantial effect), the updated configuration settings are updated according to the service model, as indicated at block 660. Utilization of the service model to create updated configuration settings is discussed more fully above with reference to FIG. 2. As indicated at block 670, the formalized values are derived from the updated configuration settings. As indicated at block 680, the component programs are reconfigured with the derived formalized values. In embodiments, reconfiguration includes the steps listed in FIG. 3.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for managing one or more component programs within a service application according to a service model, the method comprising:
determining a level of load on the service application, wherein the service application comprises the one or more component programs that are executable on separate computing devices within a data center;
extracting from the service model configuration settings that can be administered to the one or more component programs;
initiating an instantiation process for managing the service application in accordance with the level of the load, the instantiation process comprising:
(a) deploying the one or more component programs within the data center;
(b) determining a state of each of the one or more deployed component programs;
(c) accessing a transformation map, wherein the transformation map includes logic for expressing the configuration settings as formalized values that correspond to the state of each of the one or more component programs;
(d) employing the logic of the transformation map to derive the formalized values from the configuration settings according to the logic of the transformation map; and
(e) automatically propagating the derived formalized values throughout the one or more deployed component programs; and
at least temporarily installing the formalized values into the one or more component programs, thereby providing for functionality of the service application consistent with the service model.

2. The one or more computer-storage media of claim 1, wherein determining a level of load comprises monitoring traffic at a website hosting the service application.

3. The one or more computer-storage media of claim 1, wherein the service application comprises software residing on a data center maintained by an application-service provider accessible to a client via a web-browser application.

4. The one or more computer-storage media of claim 3, wherein the service model is generated, in part, according to a service-description contract established between the application-service provider and the client.

5. The one or more computer storage media of claim 1, further comprising executing the service application according to the installed formalized values.

6. A computer system for performing a method of instantiating a service application by propagating configuration settings to one or more component programs, thereby promoting functionality of the service application, the computer system comprising:
a first computing device to execute the one or more component programs that support operation of the service application; and
a second computing device to initiate an instantiation process for implementing the service application according to a service model, the instantiation process comprising:
(a) extracting configuration settings from specifications within the service model;
(b) identifying the one or more component programs residing on the first computing device as being available for instantiation;
(c) interrogating parameters within the one or more component programs to establish whether some of the one or more component programs are compatible with the configuration settings;
(d) accessing a structure map from the one or more compatible component programs, wherein the structure map includes logic for locating the parameters within the one or more compatible component programs;
(e) automatically propagating formalized values derived from the configuration settings throughout the one or more compatible component programs;
(f) directing the formalized values derived from the configuration settings to the parameters according to the logic of the structure map; and
(g) configuring the parameters of the one or more compatible component programs according to the formalized values.

7. The computer system of claim 6, wherein the instantiation process further comprises:
receiving an indication of an amendment to the specifications of the service model; and
extracting updated configuration settings from the amended specifications.

8. The computer system of claim 7, wherein the one or more component programs residing on the first computing device are developed according to a set of rules that permits the parameters to reconfigure automatically upon receiving formalized values from the updated configuration settings.

9. The computer system of claim 6, wherein the second computing device is further configured to execute the one or more component programs that support the operation of the service application.

10. The computer system of claim 9, wherein the configuration settings include component addresses, the component addresses permitting the one or more component programs residing on the first computing device to coordinate activities with the one or more component programs residing on the second computing device.

11. The computer system of claim 6, wherein the configuration settings include algorithm identifiers, the algorithm identifiers instructing the one or more component programs to launch a particular algorithm, thereby affecting the execution of the service application.

12. The computer system of claim 6, further comprising a set of dependent services to support the operation of the service application, the service application being managed by an application-service provider and the set of dependent services being managed by at least one entity separate from the application-service provider.

13. The computer system of claim 12, wherein the configuration settings include resource locations, the resource locations permitting the one or more component programs to coordinate activities with the set of dependent services located externally of the first computing device and the second computing device.

14. The computer system of claim 13, wherein coordinating activities comprise:
exchanging messages between the set of dependent services and the one or more component programs; and
comparing the exchanged messages with the formalized values installed at the parameters of the one or more compatible component programs.

15. The computer system of claim 6, wherein the first computing device and the second computing device comprise a data center, wherein the data center includes memory resources that store data, wherein the data at the memory resources are accessible by the one or more component programs.

16. The computer system of claim 15, wherein the configuration settings include memory-resource addresses, the memory-resource addresses permitting the one or more component programs to locate the appropriate memory resources for accessing the data.

17. A computerized method for configuring component programs of a service application, operating in a data center, according to an instantiation scheme, the method comprising:
determining configuration settings by interrogating a service model;
accessing the instantiation scheme, wherein the instantiation scheme indicates which component programs to deploy in order to satisfy the service model, and wherein the instantiation scheme provides a transformation map;
deploying the indicated component programs on a plurality of computing devices within the data center;
converting the configuration settings to formalized values based, in part, on the transformation map, wherein the formalized values include expected values that, upon matching a user-provided credential to a corresponding expected value of the expected values, are configured to allow a user access to the service application via one or more of the component programs;
automatically distributing the formalized values to the deployed component programs; and
at least temporarily storing the distributed formalized values in association with the deployed component programs.

* * * * *